(12) United States Patent  
Sundquist

(10) Patent No.: US 7,248,009 B1  
(45) Date of Patent: Jul. 24, 2007

(54) MOTOR TEMPERATURE CONTROL USING ESTIMATED MOTOR TEMPERATURE BASED ON MOTOR POWER DISSIPATION

(75) Inventor: Robert S. Sundquist, Paola, KS (US)

(73) Assignee: Honeywell International Inc., Morristown, NJ (US)

( * ) Notice: Subject to any disclaimer, the term of this patent is extended or adjusted under 35 U.S.C. 154(b) by 116 days.

(21) Appl. No.: 11/224,876

(22) Filed: Sep. 12, 2005

Related U.S. Application Data

(60) Provisional application No. 60/688,500, filed on Jun. 7, 2005.

(51) Int. Cl.
*H02K 17/32* (2006.01)

(52) U.S. Cl. ............ 318/434; 318/433; 318/432; 318/782; 318/783

(58) Field of Classification Search ........... 318/434, 318/782, 783, 471, 432, 433; 388/903, 934
See application file for complete search history.

(56) References Cited

U.S. PATENT DOCUMENTS 5,539,601 A   7/1996   Farag  
2004/0195989 A1*   10/2004   Harriman et al. ........... 318/599

* cited by examiner

*Primary Examiner*—Karen Masih  
(74) *Attorney, Agent, or Firm*—Ingrassia Fisher & Lorenz

(57) ABSTRACT

A system and method of controlling motor temperature is based on computed motor power dissipation and a thermal model of the motor, rather than a measured motor temperature, in a control loop that limits the motor drive to prevent overheating. An ambient temperature sensor senses the ambient temperature near the motor, and a determination is made of the motor power dissipation. The motor winding temperature is estimated based on the sensed ambient temperature and the determined motor power dissipation. A maximum motor power dissipation that would raise the motor temperature to a predetermined maximum temperature value is determined based on the estimated temperature. The motor power dissipation is limited to a value that is below the determined maximum power dissipation.

20 Claims, 3 Drawing Sheets

MOTOR TEMPERATURE CONTROL USING ESTIMATED MOTOR TEMPERATURE BASED ON MOTOR POWER DISSIPATION

CROSS-REFERENCES TO RELATED APPLICATIONS

This application claims the benefit of U.S. Provisional Application No. 60/688,500, filed Jun. 7, 2005.

TECHNICAL FIELD

The present invention generally relates to motor temperature control and, more particularly, to a system and method of controlling motor temperature based on the power being dissipated by the motor.

BACKGROUND OF THE INVENTION

Aircraft typically include a plurality of flight control surfaces that, when controllably positioned, guide the movement of the aircraft from one destination to another. The number and type of flight control surfaces included in an aircraft may vary, but typically include both primary flight control surfaces and secondary flight control surfaces. The primary flight control surfaces are those that are used to control aircraft movement in the pitch, yaw, and roll axes, and the secondary flight control surfaces are those that are used to influence the lift or drag (or both) of the aircraft.

In some aircraft, the positions of the aircraft flight control surfaces may be controlled via input from the flight crew and/or via an autopilot system. The autopilot system generates appropriate position commands that move at least some of the aircraft flight control surfaces (e.g., the primary flight control surfaces) to desired positions. In most instances, this movement is effected via actuators that are coupled to the flight control surfaces. In some autopilot systems, some or all of the actuators are electromechanical actuators. Electromechanical actuators typically include an electric motor that receives motor commands from a controller. In response to these motor commands, the motor generates torque, which is transmitted to an actuator that in turn effects movement of a flight control surface.

Preferably, the motor commands are such that the power dissipation by the motor is sufficiently low, or over sufficiently short time intervals, that the motor can comply with the commands without overheating. However, there may be instances in which this is not the case. Thus, it may be desirable to measure motor temperature and, based on the measured temperature, limit motor power to prevent such overheating. Yet, it is typically impractical to measure the temperature of the motor directly, since its rotation can make attachment of a temperature sensor difficult, if not unfeasible.

Hence, there is a need for a system and method of monitoring and controlling motor temperature to ensure that the motor will not overheat, and that does not rely on a direct measurement of motor temperature. The present invention addresses at least this need.

BRIEF SUMMARY OF THE INVENTION

The present invention controls motor temperature based on computed motor power dissipation and a thermal model of the motor, in place of measured motor temperature, in a control loop that limits the motor drive to prevent overheating.

In one embodiment, and by way of example only, a method of limiting motor temperature to a predetermined maximum temperature value by limiting motor power dissipation includes sensing ambient temperature near the motor, determining the motor power dissipation, and estimating motor winding temperature based on the sensed ambient temperature and the determined motor power dissipation. A maximum motor power dissipation that would raise the motor temperature to the predetermined maximum temperature value in a predetermined time period is determined based on the estimated winding temperature. The motor power dissipation is limited to a value that is below the determined maximum power dissipation.

In yet another exemplary embodiment, a system for limiting motor temperature includes an ambient temperature sensor, motor power dissipation determination means, thermal model means, power dissipation limit determination means, and limiter means. The ambient temperature sensor is operable to sense ambient temperature near the motor and supply an ambient temperature signal representative thereof. The motor power dissipation determination means is responsive to motor commands for supplying a motor power dissipation signal representative of power dissipation by the motor. The thermal model means is responsive to the ambient temperature signal and the motor power dissipation signal for estimating motor winding temperature, and for supplying a motor winding temperature signal representative thereof. The power dissipation limit determination means is responsive to the motor winding temperature signal for determining a maximum motor command that, when supplied to the motor, would raise the motor temperature to the predetermined maximum temperature value in a predetermined time period, and for supplying a motor power dissipation limit signal representative thereof. The limiter means is responsive to the motor power dissipation limit signal for limiting the motor commands supplied to the motor based on the determined power dissipation limit signal.

In still another exemplary embodiment, a flight control surface actuation system includes an actuator motor, a flight control surface actuator, an ambient temperature sensor, and an actuator controller. The actuator motor is coupled to receive actuator motor commands and is configured, upon receipt thereof, to supply a drive force. The flight control surface actuator is coupled to receive the drive force and is operable, upon receipt thereof, to move to a commanded position. The ambient temperature sensor is operable to sense ambient temperature near the actuator motor and supply an ambient temperature signal representative thereof. The actuator controller is coupled to receive the ambient temperature signal and is adapted to receive flight surface position commands. The actuator controller is operable, in response to the ambient temperature signal and the flight control surface position commands, to supply the actuator motor commands to the actuator motor and limit actuator motor temperature to a predetermined maximum temperature. The actuator controller includes motor power dissipation determination means, thermal model means, power dissipation limit determination means, and limiter means. The motor power dissipation determination means is responsive to the actuator motor commands for supplying a motor power dissipation signal representative of power dissipation by the motor. The thermal model means is responsive to the ambient temperature signal and the motor power dissipation signal for estimating motor winding temperature and for supplying a motor winding temperature signal representative thereof. The power dissipation limit determination means is responsive to the motor winding temperature signal for determining a maximum actuator motor power that, when supplied to the actuator motor, would raise the actuator motor temperature to the predetermined maximum temperature value in a predetermined time period and for supplying a maximum actuator motor power dissipation signal representative thereof. The limiter means is responsive to the maximum actuator motor power dissipation signal for limiting the actuator motor commands supplied to the actuator motor based on the determined maximum actuator motor power.

Other independent features and advantages of the preferred motor temperature control system and method will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention. In this regard, although the following system and method are described as being implemented in a flight control system, it will be appreciated that the system and method may be implemented in any one of numerous other devices and systems that use electric motors.

Figure 1:
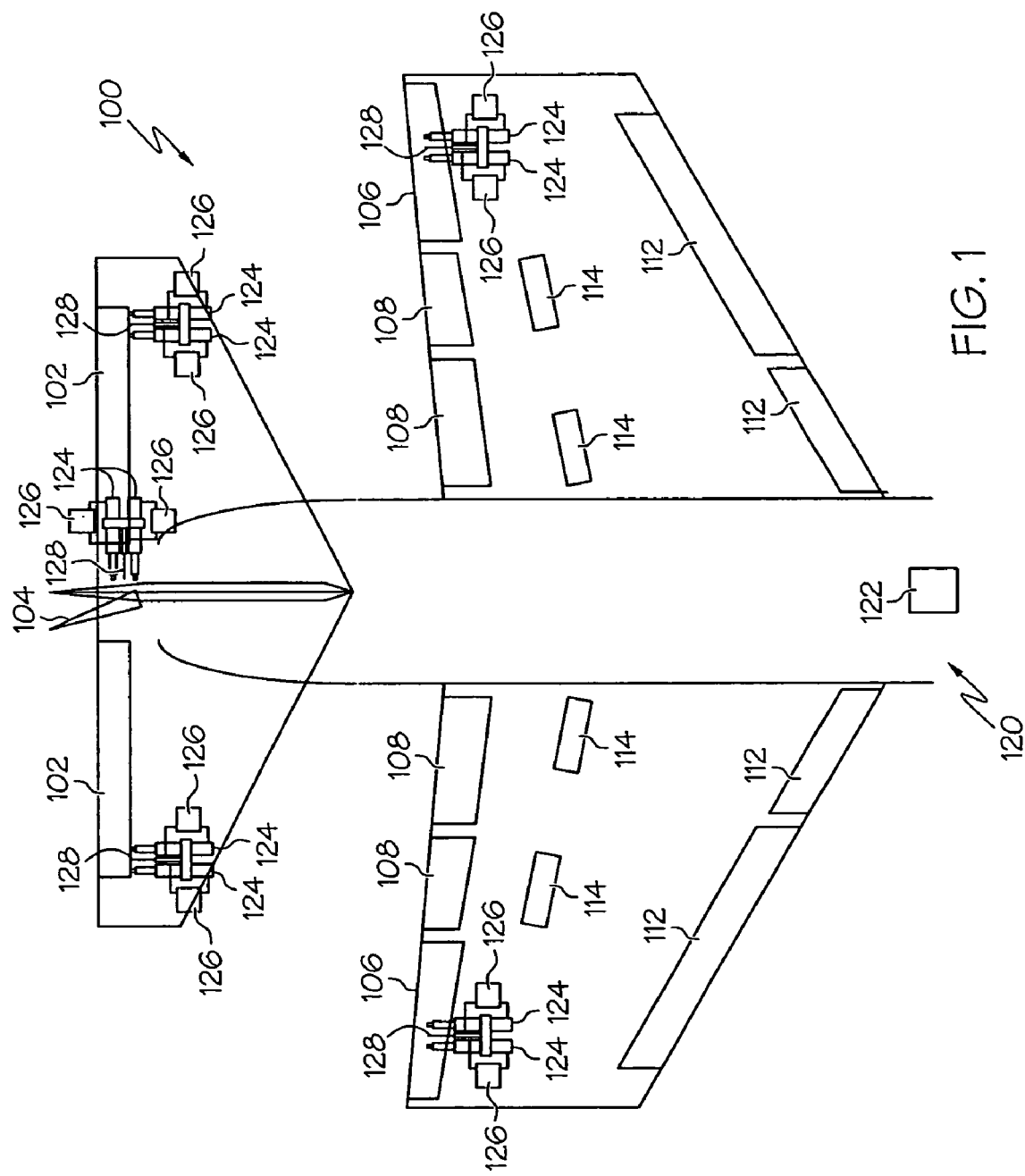
FIG. 1 is a schematic diagram of a portion of an exemplary aircraft depicting an embodiment of an exemplary flight control surface actuation system that may implement the present invention.

Turning first to FIG. 1, a schematic diagram of a portion of an exemplary aircraft and an exemplary flight control surface actuation system is shown. In the illustrated embodiment, the aircraft 100 includes a pair of elevators 102, a rudder 104, and a pair of ailerons 106, which are the primary flight control surfaces, and a plurality of flaps 108, slats 112, and spoilers 114, which are the secondary flight control surfaces. The primary flight control surfaces 102–106 control aircraft movements about the aircraft pitch, yaw, and roll axes. Specifically, elevators 102 are used to control aircraft movement about the pitch axis, the rudder 104 is used to control aircraft movement about the yaw axis, and the ailerons 106 control aircraft movement about the roll axis. It is noted, however, that aircraft movement about the yaw axis can also be achieved either by banking the aircraft or by varying the thrust levels from the engines on opposing sides of the aircraft 100.

The secondary control surfaces 108–114 influence the lift and drag of the aircraft 100. For example, during aircraft take-off and landing operations, when increased lift is desirable, the flaps 108 and slats 112 may be moved from retracted positions to extended positions. In the extended position, the flaps 108 increase both lift and drag, and enable the aircraft 100 to descend more steeply for a given airspeed, and also enable the aircraft 100 to get airborne over a shorter distance. The slats 112, in the extended position, increase lift, and are typically used in conjunction with the flaps 108. The spoilers 114, on the other hand, reduce lift and when moved from retracted positions to extended positions, which is typically done during aircraft landing operations, may be used as air brakes to assist in slowing the aircraft 100.

The flight control surfaces 102–114 are moved to desired positions via input from the flight crew. More specifically, non-illustrated mechanical linkages between non-illustrated pilot controls and the flight control surfaces or non-illustrated actuators effectuate movement of the flight control surfaces 102–114. In addition to, or instead of, input from the flight crew, the primary flight control surfaces 102–106 are moved via an autopilot system 120. The autopilot system 120 includes an autopilot computer 122 and a plurality of primary flight control surface actuator assemblies 124. It will be appreciated that one or more secondary flight control surface actuator assemblies are also typically coupled to each secondary flight control surface 108–114. However, for clarity and ease of illustration and further description, the secondary flight control surface actuators are not depicted and are not further described herein.

The autopilot computer 122, when properly activated, supplies flight control surface position commands to the appropriate primary flight control surface actuator assemblies 124. The primary flight control surface actuator assemblies 124, in response to the flight control surface position commands, move the appropriate primary flight control surfaces 102–106 to the commanded flight control surface position.

The autopilot system 120 may be implemented using various numbers of primary flight control surface actuator assemblies 124. In addition, the number of primary flight control surface actuator assemblies 124 per primary flight control surface 102–106 may be varied. In the depicted embodiment, the autopilot system 120 is configured such that pairs of actuator assemblies 124 are coupled to each of the primary flight control surfaces 102–106. The autopilot system 120 may additionally be implemented using various types of primary flight control surface actuators 124. However, in the depicted embodiment, the primary flight control surface actuators 124 are implemented using motor-driven electromechanical actuators that are each controlled via individual remote actuator controllers 126. The actuator controllers 126 each receive, via one or more non-illustrated communication channels, appropriate flight control surface position commands supplied from the autopilot computer 122. In response, the actuator controllers 126 supply actuator motor commands to the motors that drive the primary flight control surface actuators 124. The motors receive the actuator motor commands from the actuator controllers 126 and, in response, rotate in either the clockwise direction or the counterclockwise direction to drive the actuators 126 in either a first direction or a second direction, to move the primary flight control surfaces 102–106 up and down or left and right, as appropriate.

Although the actuator motor commands may be implemented using any one of numerous types of signals, in the depicted embodiment, the actuator motor commands are implemented as pulse-width modulated (PWM) signals. The duty cycle of a PWM signal controls the average current supplied to a motor, and hence the torque output of the motor. As was noted above, the actuator motor commands can result in high torque output from the actuator motors, and hence high power dissipation. Thus, the actuator controllers 126 each implement a control loop that prevents the actuator motors from overheating during flight control surface actuation.

Figure 2:
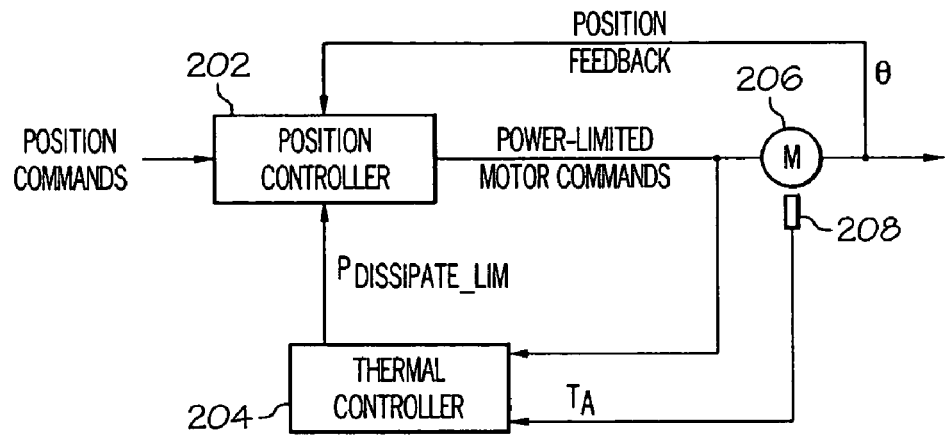
FIG. 2 is a functional block diagram of an embodiment of a control loop of the present invention that may be used in the system of FIG. 1.

An exemplary embodiment of the control loop that is implemented in the actuator controllers 126 is depicted in FIG. 2, and will now be described in more detail. Before doing so, however, it will be appreciated that although the control loop is depicted using functional blocks, this is done merely for ease of illustration and description and that the control loop may be implemented using any one of numerous configurations and techniques. For example, the control loop may be implemented, either partially or wholly, in hardware, using either digital or analog circuits, or it may be implemented in software, firmware, or various combinations of hardware, software, and firmware. Further, although the term "circuit" or "function" may be used herein, it will be appreciated that these terms are not limited to implementations using individual circuits or circuit elements. Rather, these terms encompass implementations of the various circuits or functions, partially or wholly, in one or more programmable or application specific integrated circuits, multiple digital or analog hardware components, software, firmware, or various combinations thereof.

Turning now to a description of the control loop, it is seen that the control loop 200 implements both a position controller 202 and a thermal controller 204. The position controller 202 may be implemented using any one of numerous position controllers, now known or developed in the future, for controlling position. As depicted in FIG. 2, the position controller 202 receives desired position commands, such as the flight control surface position commands issued from one of the above-described autopilot computer 122, and motor power dissipation limits ($P_{DISSIPATE\_LIM}$) supplied from the thermal controller 204. In response to the desired position commands and the motor power dissipation limits ($P_{DISSIPATE\_LIM}$), the position controller 202 supplies power-limited motor commands, such as the actuator motor commands described above, to the motor 206. The motor 206 responds to the power-limited motor commands and rotates in the commanded direction to supply a drive force to, for example, a primary actuator assembly 124. The position controller 202 also receives a position feedback signal (θ), which may be supplied from either a non-illustrated motor position sensor such as, for example, a resolver unit, or an actuator position sensor or flight control surface position sensor 128 (see FIG. 1) such as, for example, an LVDT (linear variable differential transformer), to implement the closed-loop position control. It will be appreciated that the power-limited motor commands may be implemented as any one of numerous physical quantities and in any one of numerous forms. For example, the power-limited motor commands may be implemented as a current or a voltage and as, for example, variable duty cycle PWM signals, as described above.

The thermal controller 204 receives an ambient temperature signal ($T_A$) from an ambient temperature sensor 208 and the power-limited motor commands that are supplied from the position controller 202 to the motor 206. Before proceeding further it is noted that the ambient temperature sensor 208 may be any one of numerous types of temperature sensors including, for example, an RTD (resistance temperature detector), a thermocouple, or an optical temperature sensor, just to name a few. The temperature sensor 208 may additionally be disposed in any one of numerous configurations and in any one of numerous locations. Preferably, however, the ambient temperature sensor 208 is disposed sufficiently near the motor 206 such that the temperature signal it supplies is representative of the ambient temperature around the motor 206. One exemplary location is on the circuit board (not illustrated) of the actuator controller 126 associated with the particular actuator motor 206

Returning now to the description, the thermal controller 204, in response to the ambient temperature signal ($T_A$) and the power-limited motor commands, computes the instantaneous power dissipation of the motor 206 and, using a thermal model of the motor 206, determines the maximum power that the motor 206 can dissipate and not exceed a predetermined maximum motor temperature ($T_{MAX}$) in a predetermined time period (τ). The thermal controller 204 then determines the motor power dissipation limits ($P_{DISSIPATE\_LIM}$) that correspond to the determined maximum motor power dissipation, and supplies these limits ($P_{DISSIPATE\_LIM}$) to the position controller 202. It is noted that the predetermined maximum motor temperature ($T_{MAX}$) is a manufacturer specified temperature that corresponds to the maximum temperature which the motor 206, and more specifically the rotor windings in the motor 206, may attain without overheating. It is further noted that the predetermined time period (τ) is a design parameter that is implemented as a gain factor in the thermal controller 204, which is described in more detail further below. The particular value of the predetermined time period that is chosen may vary to meet desired performance and response characteristics. For example, a relatively large value would result in motor power being gradually limited for a relatively longer time before the motor temperature reaches the maximum ($T_{MAX}$), whereas a relatively small value would allow the motor temperature to get closer to the maximum ($T_{MAX}$) before power limiting (described in more detail further below) is implemented.

Figure 3:
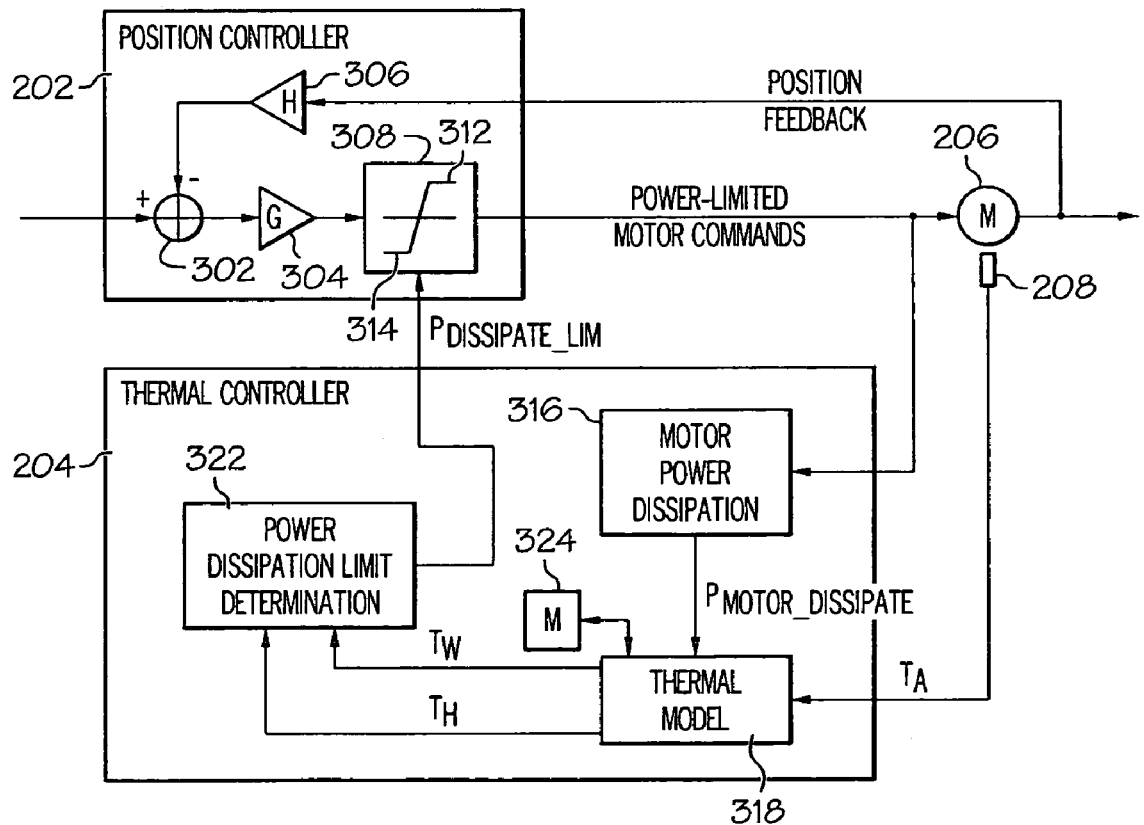
FIG. 3 is a more detailed functional block diagram of the control loop of FIG. 2.

Turning now to FIG. 3, more detailed functional block diagrams of the position controller 202 and the thermal controller 204 are depicted and will be described. The position controller 202, as alluded to above, may be implemented using any one of numerous conventional position controllers and may vary from system to system. Thus, in the depicted embodiment, the position controller 202 is depicted as implementing a conventional comparator function 302, a conventional motor transfer function (G) 304, and a conventional feedback transfer function (H) 306. A detailed description of these portions of the position controller 202 is not necessary to enable or fully describe the instant invention, and as such will not be further described. However, unlike most conventional position controllers, the depicted position controller 202 additionally includes limiter logic 308.

The limiter logic 308 limits the motor commands that are supplied from the motor transfer function (G) 304 to a value within a predetermined range of values, and thus supplies the power-limited motor commands to the motor 206. More specifically, the limiter logic 308 does not limit the motor commands supplied from the motor transfer function (G) 304 if the motor commands are between the motor command limits 312, 314 that are set within the limiter logic 308. If, however, the motor transfer function (G) 304 supplies motor commands that are not between the motor command limits 312, 314, then the limiter logic 308 will set the motor commands equal to the specific motor command limit 312, 314 that is being exceeded. As FIG. 3 depicts, the motor command limits 312, 314 are set based on the motor power dissipation limits ($P_{DISSIPATE\_LIM}$) supplied from the thermal controller 204.

The thermal controller 204 includes a motor power determination function 316, a thermal model 318, and a power dissipation limit determination function 322. The motor power determination function 316 receives the power-limited motor commands that are being supplied to the motor 206. The motor power determination circuit 316, in response to the power-limited motor commands, determines the instantaneous power that the motor 206 is dissipating in response to the power-limited motor commands and supplies a motor power dissipation signal ($P_{MOTOR\_DISSIPATE}$) representative thereof to the thermal model 318.

Figure 4:
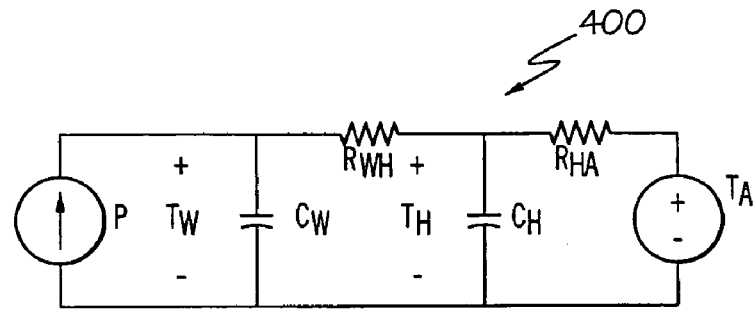
FIG. 4 is a schematic diagram of an equivalent electrical circuit for a thermal model of a motor that may be used in the control loops of FIGS. 2 and 3.

The thermal model 318 receives the motor power dissipation signal ($P_{MOTOR\_DISSIPATE}$) and the ambient temperature signal ($T_A$) and, in response, calculates the temperatures of the motor windings ($T_W$) and motor housing ($T_H$), and supplies temperature signals representative thereof to the power dissipation limit determination function 322. To implement this functionality, the thermal model 318 combines various motor parameters, which are specified by the motor manufacturer, into an equivalent electrical circuit. An exemplary embodiment of the equivalent electrical circuit 400 is depicted in FIG. 4 and, as shown therein, the motor parameters that are used to implement the equivalent circuit 400 include the thermal capacity of the motor windings ($C_W$), the thermal capacity of the motor housing ($C_H$), the thermal resistance from the motor windings to the motor housing ($R_{WH}$), and the thermal resistance from the motor housing to ambient ($R_{HA}$). It will be appreciated that in some embodiments, depending on the particular physical implementation of the motor 206, the thermal capacity ($C_H$) and the thermal resistance ($C_{WH}$) associated with the motor housing may be negligible and may therefore not be included in the thermal model 400. Moreover, in some embodiments, other motor component temperatures may be estimated and appropriate parameters thereof included in the thermal model 318.

The thermal model 318, using the depicted equivalent circuit model 400, continuously calculates the motor winding temperature ($T_W$) and the motor housing temperature ($T_H$) by numerically integrating the following differential equations:

$$\frac{dT_W}{dt} = \left(\frac{1}{C_W}\right)\left(P_{MOTOR} - \frac{T_W - T_H}{R_{WH}}\right) \quad \text{(eq. 1)}$$

$$\frac{dT_H}{dt} = \left(\frac{1}{C_H}\right)\left(\frac{T_W - T_H}{R_{WH}} - \frac{T_W - T_A}{R_{HA}}\right). \quad \text{(eq. 2)}$$

It is noted that the initial values for the motor winding temperature ($T_W$) and the motor housing temperature ($T_H$) preferably are each set, at power-on, to either the current ambient temperature ($T_A$) or the respective temperature values ($T_W$, $T_H$) that were calculated just prior to motor or system power-off, whichever is greater. In doing so, this gives a conservative estimate of the internal motor temperatures that will ensure motor overheat prevention, either after a short power interruption or a long power-off time. It is additionally noted that the values of the motor winding temperature ($T_W$) and the motor housing temperature ($T_H$) at power-off are preferably stored in non-volatile memory 324 (see FIG. 3) prior to power-off.

Returning now to FIG. 3, the power dissipation limit determination function 322, in response to the motor winding temperature ($T_W$) and motor housing temperature ($T_H$) signals, determines the maximum power ($P_{MAX\_DISSIPATE}$) that the motor 206 can dissipate and not exceed the predetermined maximum motor temperature ($T_{MAX}$) in a predetermined time period. The power dissipation limit determination function 322 additionally determines the motor power dissipation limits ($P_{DISSIPATE\_LIM}$) that correspond to the determined maximum motor power dissipation ($P_{MAX\_DISSIPATE}$). The power dissipation limit determination function 322 then supplies the dissipation limits ($P_{DISSIPATE\_LIM}$) to the limiter logic 308, which the limiter logic 318 uses to set the motor command limits 312, 314.

The thermal controller 204 depicted in FIG. 3 and described above may be implemented using any one of numerous algorithms, circuits, components, and in any one of numerous configurations thereof. The particular implementation may vary depending, for example, on the manner in which the motor commands are implemented. For example, in the depicted embodiment the motor commands, as noted above, are implemented as variable duty cycle PWM signals, which control the average current supplied to the motor 206. A particular preferred implementation of the thermal controller 204 for use in a system that supplies variable duty cycle PWM signals is depicted in more detail in FIG. 5, and will now be described.

Figure 5:
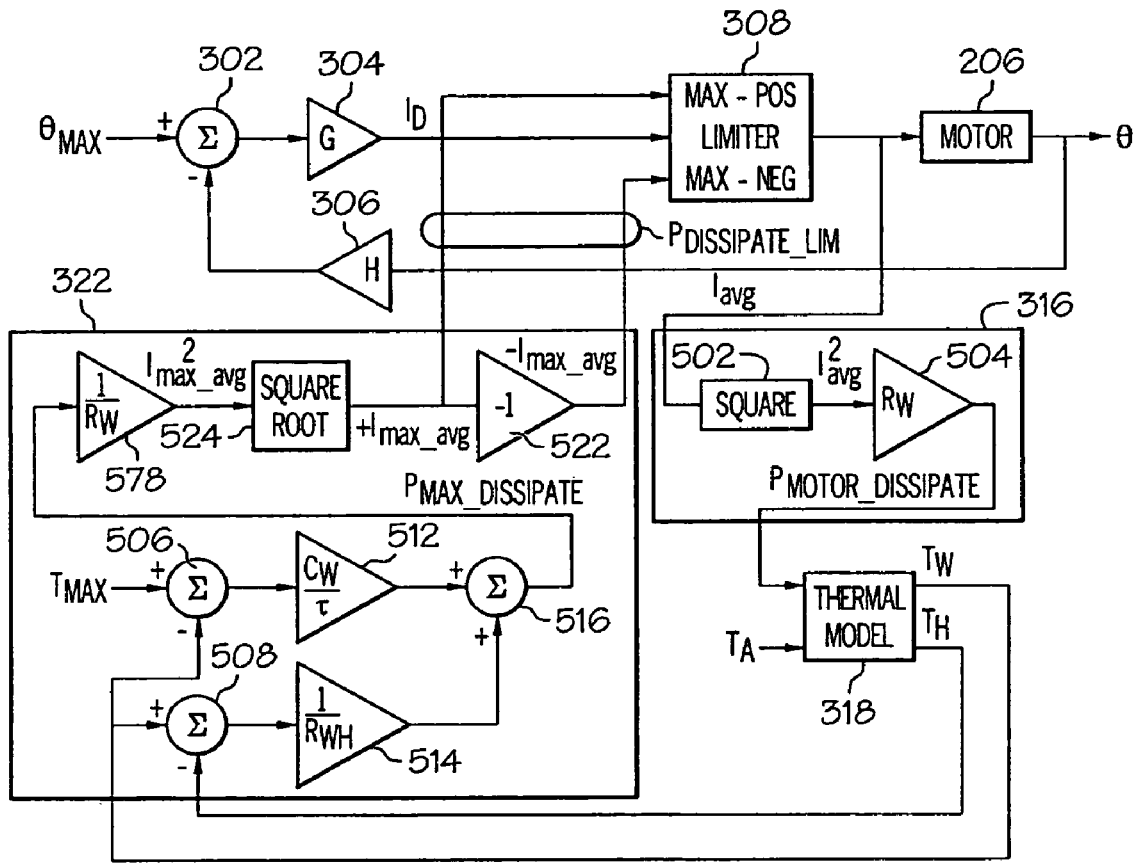
FIG. 5 is a more detailed functional block diagram of an exemplary embodiment of a thermal controller that may be used to implement the control loops of FIGS. 2 and 3.

In the thermal controller 204 depicted in FIG. 5, the motor power determination function 316 includes a mathematical squaring function 502 and a multiplier function 504. The mathematical squaring function 502 receives the power-limited motor commands, which are implemented as variable average current signals ($I_{avg}$) supplied to the motor 206, and mathematically squares the average motor current ($I_{avg}^2$). The squared average motor current ($I_{avg}^2$) is supplied to the multiplier function 504, which mathematically multiplies the squared average motor current by the motor winding resistance ($R_W$), which is another manufacturer specified parameter, to thereby determine the instantaneous motor power dissipation (e.g., $P = I_{avg}^2 R_W$) and supply the motor power dissipation signal ($P_{MOTOR\_DISSIPATE}$).

The thermal model 318, implementing the methodology described above, receives the motor power dissipation signal ($P_{MOTOR\_DISSIPATE}$) and the ambient temperature signal ($T_A$), calculates the motor winding temperature ($T_W$) and the motor housing temperature ($T_H$), and supplies signals representative thereof to the position command limit determination function 322. The power dissipation limit determination function 322 includes two subtraction functions 506, 508, two multiplier functions 512, 514, and an addition function 516. These functions are configured to implement the following equation:

$$P_{MAX\_DISSIPATE} = \frac{C_W(T_{max} - T_W)}{\tau} + \frac{T_W - T_H}{R_{WH}}. \quad \text{(eq. 3)}$$

This equation calculates the maximum motor power dissipation ($P_{MAX\_DISSIPATE}$) that would produce a temperature rate that would prevent the temperature of the motor 206 from exceeding the predetermined maximum motor temperature ($T_{MAX}$) in the predetermined time period ($\tau$).

As FIG. 5 additionally shows, the power dissipation limit determination function 322 also includes third and fourth multiplier functions 518, 522 and a square root function 524. The third multiplier function 518 mathematically multiplies the maximum motor power dissipation by the reciprocal of the motor winding resistance ($R_W$) to determine the square of maximum average current $$\left(I^2_{max\_avg} = \frac{P_{MAX\_DISSIPATE}}{R_W}\right).$$

The square of the maximum average current is supplied to the square root function 524, which determines the maximum average positive current ($I_{max\_avg}$) that will generate the maximum motor power dissipation ($P_{MAX\_DISSIPATE}$). The fourth multiplier function 522 mathematically multiplies the maximum average current by a negative one (−1) to obtain the maximum average negative current ($-I_{max\_avg}$) that will generate the maximum motor power dissipation ($P_{MAX\_DISSIPATE}$). Because the motor commands, at least in the depicted embodiment, are implemented as variable duty cycle PWM signals, the maximum positive current and maximum negative current ($I_{max\_avg}$, $-I_{max\_avg}$) are representative of the motor power dissipation limits ($P_{DISSIPATE\_LIM}$) supplied to the position controller 202, which are used to set the motor command limits 312, 314 in the limiter logic 308.

From the above description and the implementation depicted in FIG. 5, it is seen that when the temperature of the motor 206 is not near the maximum temperature ($T_{MAX}$), thermal limiting is not needed, and the position controller 202 controls the operation of the motor 206. However, when the motor temperature approaches the maximum temperature ($T_{MAX}$), the absolute value of the motor current will equal the maximum average current ($I_{max\_avg}$), and the thermal controller 204 controls the operation of the motor 206 to thereby limit motor temperature.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of limiting motor temperature to a predetermined maximum temperature value by limiting motor power dissipation, the method comprising the steps of:
   sensing ambient temperature near the motor;
   determining the motor power dissipation;
   estimating motor winding temperature based on the sensed ambient temperature and the determined motor power dissipation;
   determining a maximum motor power dissipation that would raise the motor temperature to the predetermined maximum temperature value in a predetermined time period based on the estimated winding temperature; and
   limiting the motor power dissipation to a value that is below the determined maximum power dissipation.

2. The method of claim 1, further comprising:
   estimating the motor housing temperature based on the sensed ambient temperature and the determined motor power dissipation; and
   determining the maximum motor power dissipation based on the estimated winding temperature and the estimated housing temperature.

3. The method of claim 1, further comprising:
   initializing the motor winding temperature to a predetermined motor winding temperature before an initial determination of the maximum power dissipation.

4. The method of claim 3, further comprising:
   storing a pre-shutdown motor winding temperature that corresponds to an estimated motor winding temperature just prior to a motor shutdown operation,
   wherein the predetermined motor winding temperature is the larger of the stored pre-shutdown rotor winding temperature and sensed ambient temperature during startup.

5. The method of claim 1, further comprising:
   receiving a motor command;
   determining a commanded motor current magnitude based on the motor command;
   determining a maximum motor current magnitude based on the maximum power dissipation;
   comparing the determined maximum motor current magnitude to the commanded motor current magnitude to determine which motor current magnitude is larger in value; and
   limiting the magnitude of the motor current supplied to the motor to motor current magnitude that is determined to be larger in value.

6. The method of claim 2, wherein the motor winding temperature and the motor housing temperature are estimated using a thermal model of the motor.

7. The method of claim 6, wherein the motor winding temperature is estimated by numerically integrating the following equation that is derived from the thermal model:

$$\frac{dT_w}{dt} = \left(\frac{1}{C_W}\right)\left(P - \frac{T_W - T_H}{R_{WH}}\right),$$

where:
   $T_W$=winding temperature
   $T_H$=housing temperature
   P=power dissipation
   $T_A$=measured ambient temperature
   $C_W$=thermal capacity of winding
   $C_H$=thermal capacity of housing
   $R_{WH}$=thermal resistance, winding to housing
   $R_{HA}$=thermal resistance, housing to ambient.

8. The method of claim 6, wherein the motor housing temperature is estimated by numerically integrating the following equation that is derived from the thermal model:

$$\frac{dT_H}{dt} = \left(\frac{1}{C_H}\right)\left(\frac{T_W - T_H}{R_{WH}} - \frac{T_W - T_A}{R_{HA}}\right)$$

where:
- $T_W$=winding temperature
- $T_H$=housing temperature
- P=power dissipation
- $T_A$=measured ambient temperature
- $C_W$=thermal capacity of winding
- $C_H$=thermal capacity of housing
- $R_{WH}$=thermal resistance, winding to housing
- $R_{HA}$=thermal resistance, housing to ambient.

9. The method of claim 1, wherein the step of determining the motor power dissipation comprises:
measuring motor current supplied to the motor; and
calculating the motor power dissipation from the measured motor current.

10. The method of claim 9, wherein the motor power dissipation is limited by limiting the motor current to a magnitude that will prevent the motor power dissipation from exceeding the determined maximum power dissipation.

11. The method of claim 10, wherein the motor current is limited by controlling a duty cycle of a pulse-width modulated command signal supplied to the motor.

12. A system for limiting motor temperature, comprising:
an ambient temperature sensor operable to sense ambient temperature near the motor and supply an ambient temperature signal representative thereof;
motor power dissipation determination means, responsive to motor commands, for supplying a motor power dissipation signal representative of power dissipation by the motor;
thermal model means, responsive to the ambient temperature signal and the motor power dissipation signal, for (i) estimating motor winding temperature and (ii) supplying a motor winding temperature signal representative thereof;
power dissipation limit determination means, responsive to the motor winding temperature signal, for (i) determining a maximum motor power that, when supplied to the motor, would raise the motor temperature to a predetermined maximum temperature value in a predetermined time period and (ii) supplying a motor power dissipation limit signal representative thereof; and
limiter means, responsive to the motor power dissipation limit signal, for limiting the motor commands supplied to the motor based on the determined motor power dissipation limit signal.

13. The system of claim 12, wherein:
the thermal model means is further responsive to the ambient temperature signal and the motor power dissipation signal for (i) estimating motor housing temperature and (ii) supplying a motor housing temperature signal representative thereof; and
the power dissipation limit determination means is further responsive to the motor housing temperature signal for determining the maximum motor power.

14. The system of claim 12, wherein the motor power dissipation limit determination means includes maximum power limit determination means, responsive to the motor winding temperature signal, for (i) determining a maximum motor power dissipation that would raise the motor temperature to the predetermined maximum temperature value in the predetermined period of time and (ii) supplying a maximum motor power dissipation signal representative thereof.

15. The system of claim 14, wherein the maximum motor power dissipation determination means supplies the motor power dissipation limit signal based on the determined maximum motor power dissipation.

16. The system of claim 12, wherein the thermal model means initializes the motor winding temperature to a predetermined motor winding temperature before an initial estimation thereof.

17. The system of claim 16, further comprising:
memory means for storing the estimated motor winding temperature during a motor shutdown operation.

18. The system of claim 17, wherein the thermal model means initializes the predetermined motor winding temperature to the larger of the stored estimated rotor winding temperature and sensed ambient temperature during a motor startup operation.

19. The system of claim 12, wherein:
the motor power dissipation determination means measures motor current supplied to the motor and calculates motor power dissipation from the measured motor current; and
the limiter means limits the motor current to a magnitude that will prevent the motor power dissipation from exceeding a maximum power dissipation.

20. A flight control surface actuation system, comprising:
an actuator motor coupled to receive actuator motor commands and configured, upon receipt thereof, to supply a drive force;
a flight control surface actuator coupled to receive the drive force and operable, upon receipt thereof, to move to a commanded position;
an ambient temperature sensor operable to sense ambient temperature near the actuator motor and supply an ambient temperature signal representative thereof; and
an actuator controller coupled to receive the ambient temperature signal and adapted to receive flight surface position commands, the actuator controller operable, in response to the ambient temperature signal and the flight control surface position commands, to supply the actuator motor commands to the actuator motor and limit actuator motor temperature to a predetermined maximum temperature, the actuator controller including:
motor power dissipation determination means, responsive to the actuator motor commands, for supplying a motor power dissipation signal representative of power dissipation by the motor;
thermal model means, responsive to the ambient temperature signal and the motor power dissipation signal, for (i) estimating motor winding temperature and (ii) supplying a motor winding temperature signal representative thereof, respectively;
maximum power dissipation determination means, responsive to the motor winding temperature signal, for (i) determining a maximum actuator motor power that, when supplied to the actuator motor, would raise the actuator motor temperature to the predetermined maximum temperature value in a predetermined time period and (ii) supplying a maximum actuator motor power dissipation signal representative thereof; and
limiter means, responsive to the maximum actuator motor power dissipation signal, for limiting the actuator motor commands supplied to the actuator motor based on the determined maximum actuator motor power.

* * * * *